(12) United States Patent
Yokota (10) Patent No.: US 9,950,743 B2
(45) Date of Patent: Apr. 24, 2018

(54) VEHICLE SUBFRAME

(71) Applicant: F-TECH INC., Kuki-shi, Saitama (JP)

(72) Inventor: Tomoyuki Yokota, Tochigi (JP)

(73) Assignee: F-TECH INC., Kuki (JP)

( * ) Notice: Subject to any disclaimer, the term of this patent is extended or adjusted under 35 U.S.C. 154(b) by 0 days.

(21) Appl. No.: 15/164,216

(22) Filed: May 25, 2016

(65) Prior Publication Data

US 2016/0347367 A1   Dec. 1, 2016

(30) Foreign Application Priority Data

May 29, 2015 (JP) .................................. 2015-109951

(51) Int. Cl.
*B62D 21/11* (2006.01)
*B62D 21/08* (2006.01)

(52) U.S. Cl.
CPC ............. *B62D 21/11* (2013.01); *B62D 21/08* (2013.01)

(58) Field of Classification Search
CPC ................................ B62D 21/11; B62D 21/08
USPC ........................................................ 296/204
See application file for complete search history.

(56) References Cited

FOREIGN PATENT DOCUMENTS

DE   102012215098 A1 * 5/2014 ............. B62D 21/11
JP   2000-272535 A   10/2000

* cited by examiner

*Primary Examiner* — D Glenn Dayoan
*Assistant Examiner* — Melissa A Black
(74) *Attorney, Agent, or Firm* — Westerman, Hattori, Daniels & Adrian, LLP (57) ABSTRACT

In a vehicle subframe, one of a pair of cross members includes a lower member open to a lower side of a vehicle, with an upper wall thereof having an upper wall recess depressed downward, an upper member arranged so as to cover the upper wall recess from above the vehicle and connected to the lower member, an inside space defined by the lower member and the upper member in cooperation, and a holding member connected to the lower member and the upper member in a mode in which the holding member is sandwiched between the lower member and the upper member, while penetrating the inside space in a longitudinal direction, to hold a component to be mounted.

6 Claims, 4 Drawing Sheets

VEHICLE SUBFRAME

BACKGROUND OF THE INVENTION

The present invention relates to a vehicle subframe, and more particularly relates to a vehicle subframe that supports a suspension arm, a differential device (an actuator), and the like and is mounted on a vehicle such as an automobile.

In recent years, the subframe mounted on a vehicle such as an automobile receives a large input load such as a tensile load and a compressive load from respective arms particularly generated at the time of turning or braking, due to improvement of turning performance and braking performance of the vehicle.

Therefore, with respect to such a subframe, it has been required to further increase the strength and stiffness of the subframe, while maintaining productivity thereof.

Under such circumstances, Japanese Patent Application Laid-Open Publication No. 2000-272535 relates to a vehicle subframe structure and discloses a configuration including a vehicle width-direction extending member and a reinforcing plate member, in order to maintain an aligned condition of wheels appropriately, ensure steering stability, and prevent a decrease in durability, while suppressing deformation of an inclined portion formed with a spring receiving portion at an upper end thereof toward a vehicle body center. The vehicle width-direction extending member includes right and left spring receiving portions respectively bonded and fixed to right and left side members provided in an extended manner in a longitudinal direction of the vehicle to receive a road surface reaction force from a rear wheel via a coil spring, right and left inclined portions extending downward on the vehicle body center side from the both spring receiving portions, right and left bent portions formed respectively at a lower end of the both inclined portions and coupled with a lower arm, and a linear central portion provided in an extended manner from the both bent portions to the vehicle body center side. The reinforcing plate member has a vertical plate portion with an edge being bonded and fixed to the both inclined portions and the linear central portion of the vehicle width-direction extending member, to which a rear end of a differential device is attached.

SUMMARY OF THE INVENTION

However, according to studies made by the present inventor, in Japanese Patent Application Laid-open Publication No. 2000-272535, such a case can be considered that a vertical length for attaching the rear end of the differential device to the vertical plate portion of the reinforcing plate member may not be ensured, according to the layout of peripheral components. Accordingly, there is still a room for improvement in terms of constituting a holding portion of a component to be mounted in a mode that is not affected unnecessarily by the layout of the peripheral components.

Furthermore, according to the studies made by the present inventor, a novel configuration that can ensure the balance between the strength and the stiffness at a high level, while increasing mounting flexibility of the component to be mounted such as a suspension arm and an actuator has been desired strongly.

The present invention has been achieved in view of the above problems, and an object of the present invention is to provide a vehicle subframe that can constitute a holding portion of a component to be mounted with high layout flexibility with a simple configuration, while maintaining required productivity, and can improve the support strength and stiffness of a suspension arm.

To achieve the above object, a subframe according to a first aspect of the present invention comprises a pair of side members respectively extending in a longitudinal direction of a vehicle, while facing each other in a width direction of the vehicle and a pair of cross members respectively extending in the width direction, while facing each other in the longitudinal direction, and respectively coupling the pair of side members, wherein one of the pair of cross members includes a lower member open to a lower side of the vehicle, with an upper wall thereof having an upper wall recess depressed downward, an upper member arranged so as to cover the upper wall recess from above the vehicle and connected to the lower member, an inside space defined by the lower member and the upper member in cooperation, and a holding member connected to the lower member and the upper member in a mode in which the holding member is sandwiched between the lower member and the upper member, while penetrating the inside space in the longitudinal direction, to hold a component to be mounted.

According to a second aspect of the present invention, in addition to the first aspect, the holding member is arranged to be deviated from a central portion of the lower member and the upper member in the width direction, and the lower member has a lower recess depressed toward an upper side of the vehicle and arranged with the holding member in the width direction.

According to a third aspect of the present invention, in addition to the first or second aspect, the one of the pair of cross members is a rear cross member arranged on a rear side in the longitudinal direction, and the rear cross member includes a first member having a first vertical wall and a first upper wall continuous to the first vertical wall, and a second member having a second vertical wall facing the first vertical wall in the longitudinal direction and second upper wall continuous to the second vertical wall and connected to the first upper wall, and a plate thickness of the first member is set to be equal to or larger than that of the second member.

According to a fourth aspect of the present invention, in addition to the third aspect, the other of the pair of cross members is a front cross member arranged on a front side in the longitudinal direction, and a reinforcing member connecting the rear cross member with the front cross member is farther provided.

According to a fifth aspect of the present invention, in addition to the fourth aspect, the front cross member includes a third member having a third vertical wall, a third upper wall continuous to the third vertical wall, and a third lower wall continuous to the third vertical wall, and a fourth member having a fourth vertical wall facing the third vertical wall in the longitudinal direction, a fourth upper wall continuous to the fourth vertical wall and connected to the third upper wall, and a fourth lower wall continuous to the fourth vertical wall and connected to the third lower wall, and a plate thickness of the third member is set to be equal to or larger than that of the fourth member.

According to a sixth aspect of the present invention, in addition to the fifth aspect, the reinforcing member connects the first member with the fourth member.

According to the configuration of the first aspect of the present invention, one of the pair of cross members includes the lower member open to the lower side of the vehicle, with the upper wall thereof having the upper wall recess depressed downward, the tipper member arranged so as to cover the upper wall recess from above the vehicle and connected to the lower member, the inside space defined by the lower member and the upper member in cooperation, and the holding member connected to the lower member and the upper member in the mode in which the holding member is sandwiched between the lower member and the upper member, while penetrating the inside space in the longitudinal direction, to hold the component to be mounted. Accordingly, a vehicle subframe that can reliably mount the component to be mounted without increasing a space occupied by the subframe can be realized. Further, a vehicle subframe that can configure the holding portion of the component to be mounted with high layout flexibility with a simple configuration, while maintaining required productivity, and can improve the support strength and stiffness or the suspension arm can be provided.

According to the configuration of the second aspect of the present invention, the holding member is arranged to be deviated from the central portion of the lower member and the upper member in the width direction, and the lower member has a lower recess depressed toward the upper side of the vehicle and arranged with the holding member in the width direction. Accordingly, even if the component to be mounted is arranged to be deviated in the width direction, a difference in the strength and stiffness in the width direction can be decreased, while improving the strength and stiffness of the subframe in a mode that does not degrade the layout flexibility.

According to the configuration of the third aspect of the present invention, the rear cross member includes the first member having the first vertical wall and the first upper wall continuous to the first vertical wall, and the second member having the second vertical wall facing the first vertical wall in the longitudinal direction and the second upper wall continuous to the second vertical wall and connected to the first upper wall. The plate thickness of the first member is set to be equal to or larger than that of the second member. Accordingly, the component to be mounted can be mounted, while suppressing an unnecessary increase in weight of the rear cross member, and the support strength and support stiffness of the suspension arm can be improved.

According to the configuration of the fourth aspect of the present invention, the reinforcing member that connects the rear cross member with the front cross member is further arranged. Accordingly, an input load in the longitudinal direction from the component to be mounted and the suspension arm can be reliably received.

According to the configuration of the fifth aspect of the present invention, the front cross member includes the third member having the third vertical wall, the third upper wall continuous to the third vertical wall, and the third lower wall continuous to the third vertical wall, and the fourth member having the fourth vertical wall facing the third vertical wall in the longitudinal direction, the fourth upper wall continuous to the fourth vertical wall and connected to the third upper wall, and the fourth lower wall continuous to the fourth vertical wall and connected to the third lower wall. The plate thickness of the third member is set to be equal to or larger than that of the fourth member. Accordingly, an input load from the rear cross member can be reliably received, while suppressing an unnecessary increase in weight of the front cross member.

According to the configuration of the sixth aspect of the present invention, the reinforcing member connects the first member with the fourth member. Accordingly, the required strength and stiffness can be maintained, while further suppressing the unnecessary increase in weight of the front cross member and the rear cross member.

DETAILED DESCRIPTION OF THE PREFERRED EMBODIMENT

A vehicle subframe according to an embodiment of the present invention is explained in detail below with reference to FIGS. 1 to 6 as appropriate. In the drawings, an x-axis, a y-axis, and a z-axis form a three-dimensional orthogonal coordinate system. A positive direction of the x-axis is a left direction of a vehicle body, a positive direction of the y-axis is a forward direction of the vehicle body, and a positive direction of the z-axis is an upper direction of the vehicle body. The x-axis direction may be referred to as "width direction", and the y-axis direction may be referred to as "longitudinal direction".

Figure 1:
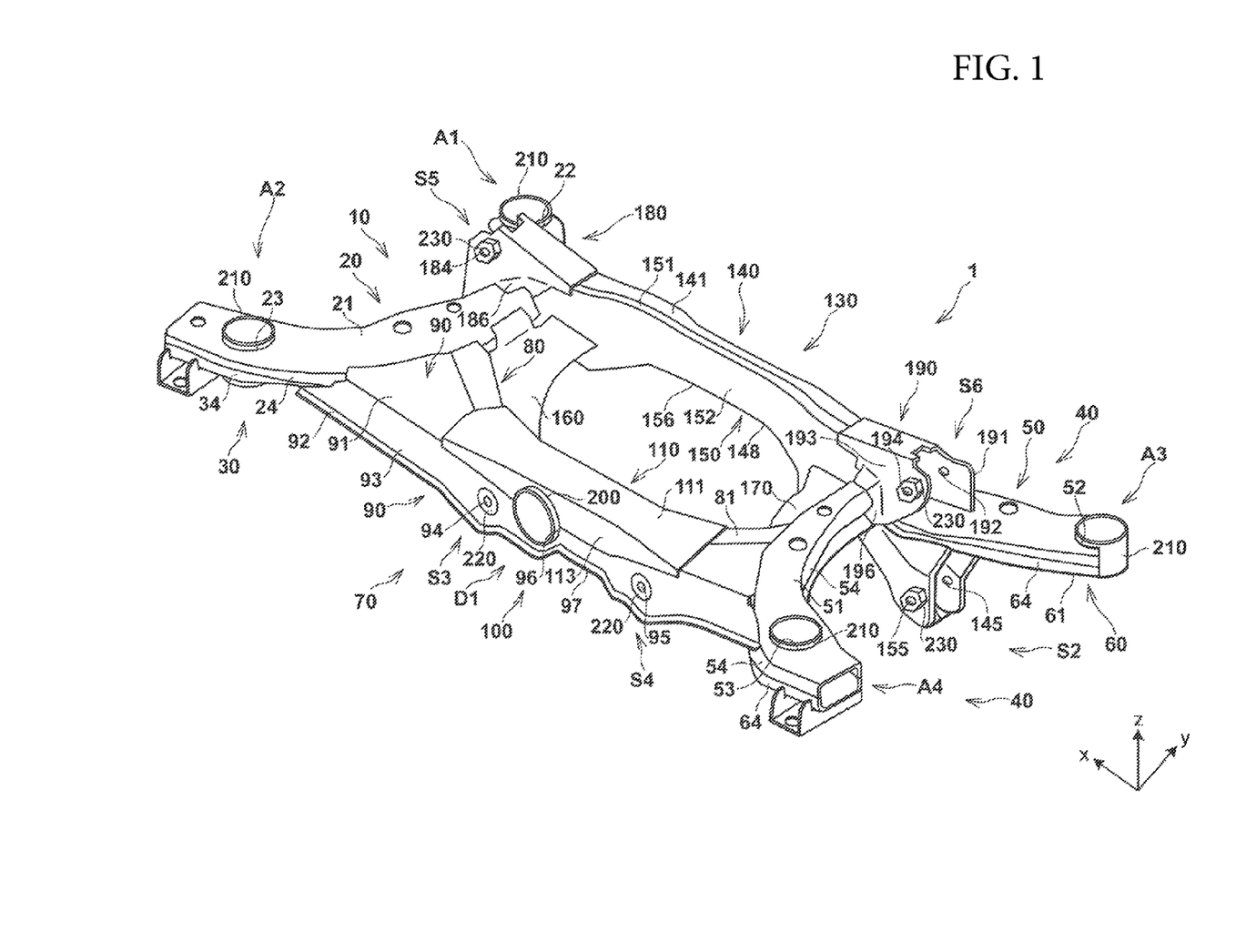
FIG. 1 is a perspective viewer a vehicle subframe according to an embodiment of the present invention.
Figure 2:
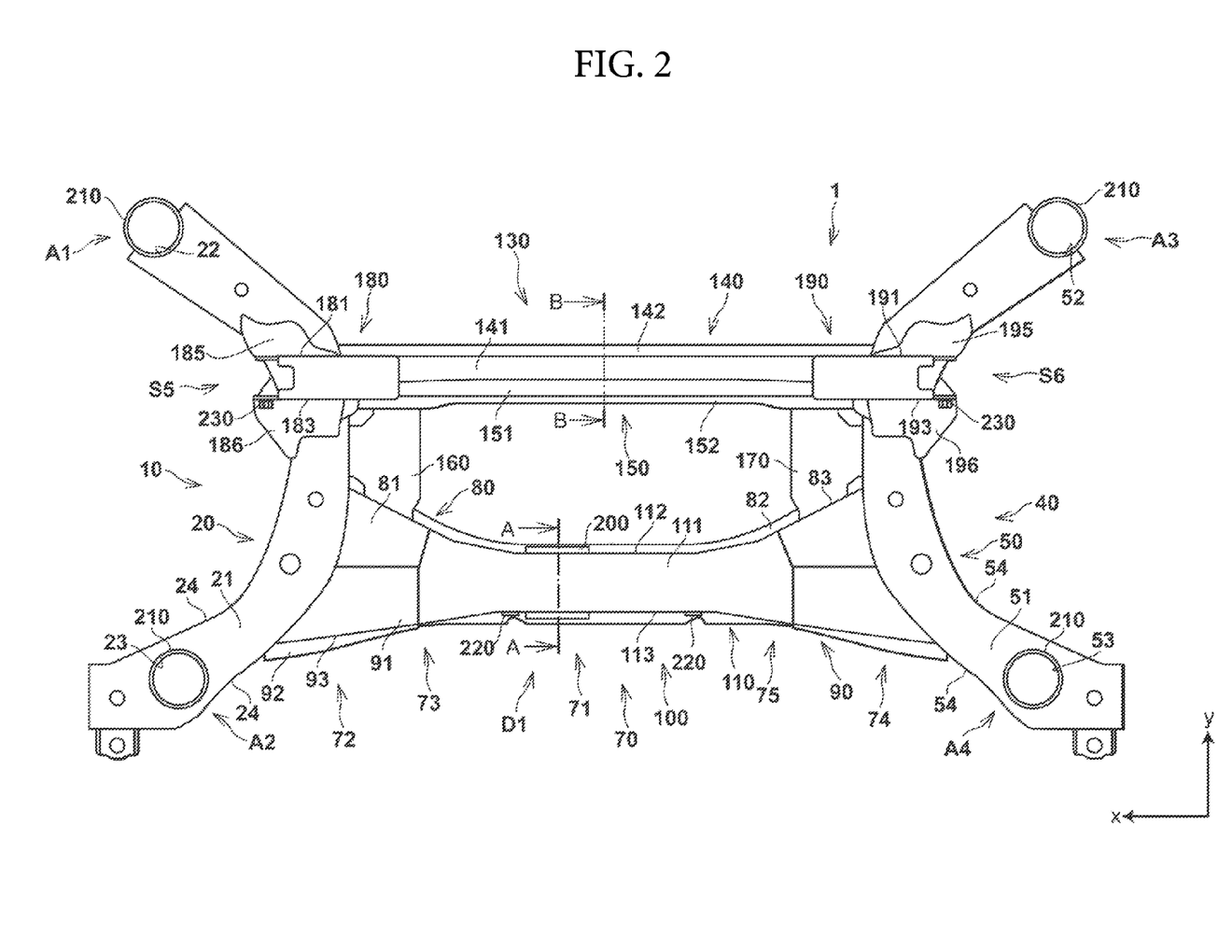
FIG. 2 is a plan view of the vehicle subframe according to the present embodiment.
Figure 3:
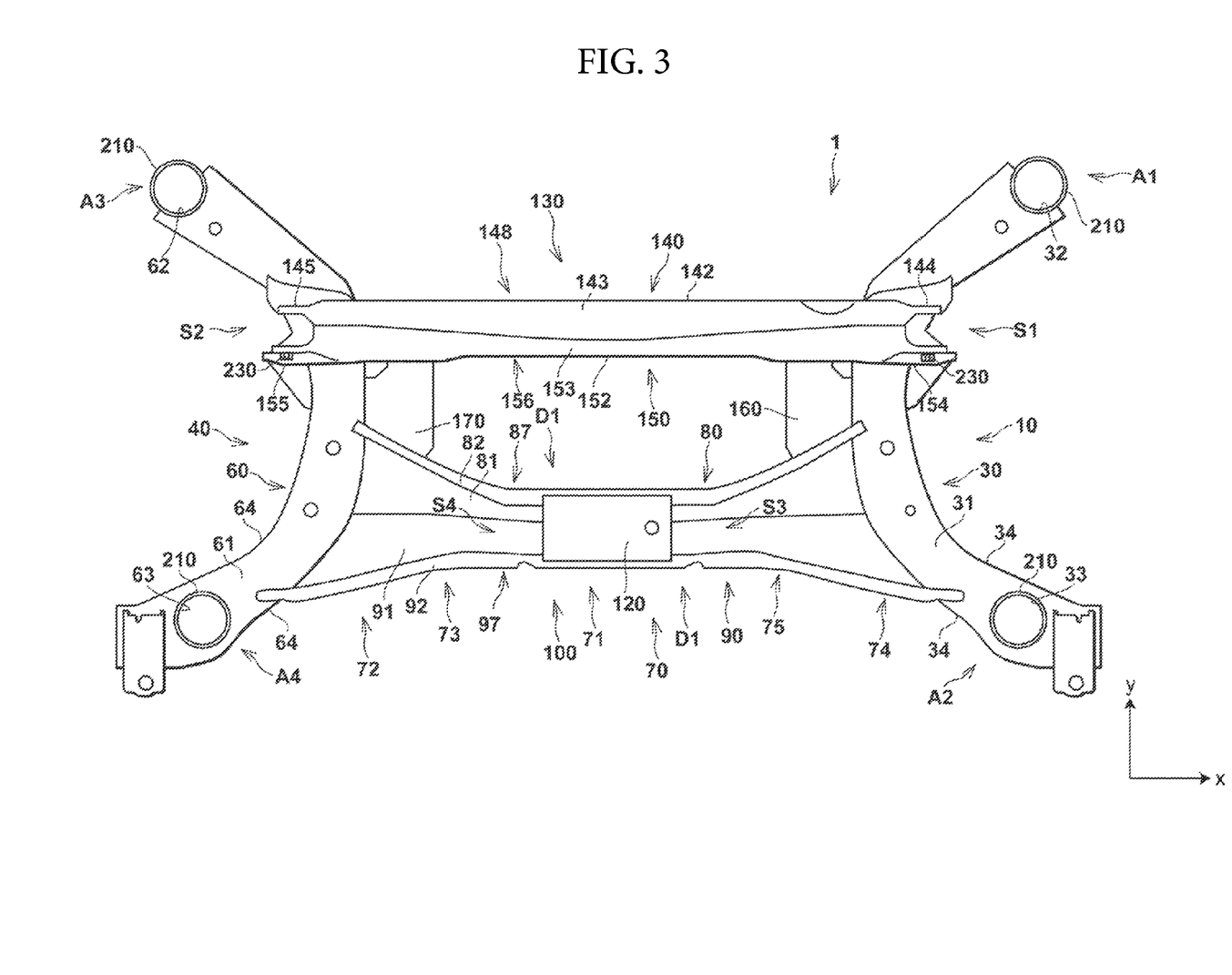
FIG. 3 is a bottom view of the vehicle subframe according to the present embodiment.
Figure 4:
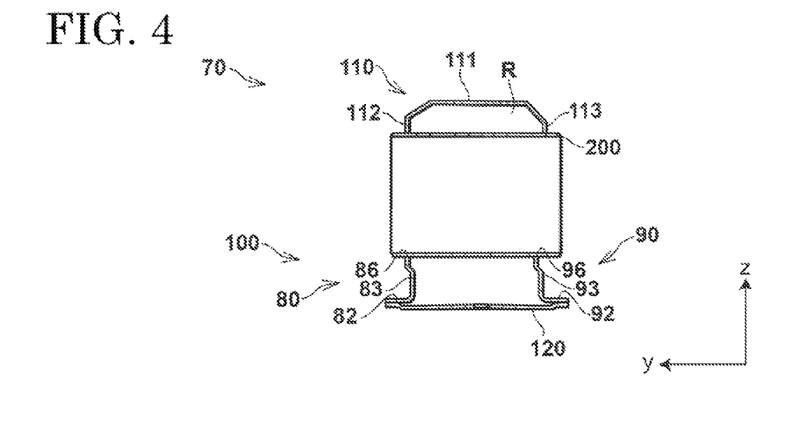
FIG. 4 is a sectional view along a line A-A in FIG. 2.
Figure 5:
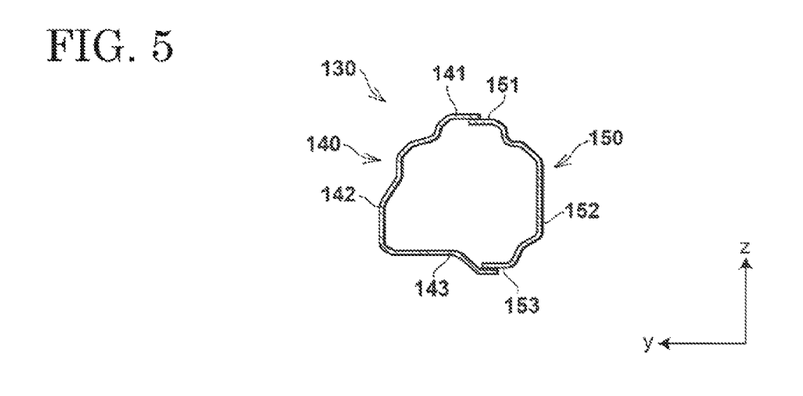
FIG. 5 is a sectional view along a line B-B in FIG. 2.
Figure 6:
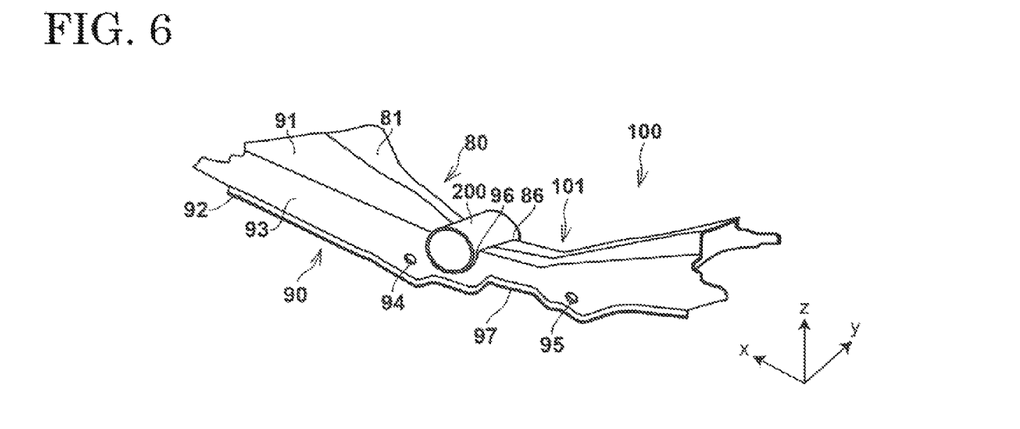
FIG. 6 is a partial exploded view of a rear cross member in which only a lower member and a holding member are shown in the subframe according to the present embodiment.

FIG. 1 is a perspective view of a vehicle subframe according to an embodiment of the present invention, FIG. 2 is a plan view of the vehicle subframe according to the present embodiment, FIG. 3 is a bottom view of the vehicle subframe according to the present embodiment, FIG. 4 is a sectional view along a line A-A in FIG. 2, and FIG. 5 is a sectional view along a line B-B in FIG. 2. FIG. 6 is a partial exploded view of a rear cross member in which only a lower member and a holding member are shown in the subframe according to the present embodiment.

As shown in FIGS. 1 to 6, a subframe 1 according to the present embodiment is mounted on a vehicle body such as a rear side frame of a vehicle such as an automobile (not shown), to support a suspension arm and a differential device. Typically, the subframe 1 basically has a symmetrical shape with respect to a plane parallel to a y-z plane and passing a center in a width direction.

Specifically, the subframe 1 is formed in a parallel cross shape as viewed in a plan view, and includes a left side member 10, a right side member 40, a rear cross member 70, and a front cross member 130, which are correspondingly welded typically by arc welding or the like and integrated with each other. The left side member 10 end the right side member 40 are respectively obtained typically by press-molding a plate member such as a steel plate, and respectively extend in a longitudinal direction, facing each other while being away from each other in the width direction. The rear cross member 70 and the front cross member 130 are respectively obtained typically by press-molding a plate member such as a steel plate, and respectively extend in the width direction, facing each other while being away from each other in the longitudinal direction. The front and rear arrangement of the subframe 1 can be reversed according to the type of the vehicle or the like to which the subframe 1 is applied.

The left side member 10, the right side member 40, the rear cross member 70, and the front cross member 130, and the configuration related thereto are described in detail sequentially from the left side member 10.

<Configuration of Left Side Member>

The left side member 10 has an upper left member 20 and a lower left member 30, which have a substantially U-shaped vertical cross section, obtained typically by press-molding a plate member such as a steel plate, and has a rightward convex curved shape in a plan view. The left side member 10 can be constituted by a pipe member such as a steel pipe.

The upper left member 20 has an upper wall 21, a notched portion 22 notched substantially in an arc-like shape at a front end of the upper wall 21, and a hole 23 formed by punching so as to penetrate the upper wall 21 in a vertical direction at the rear of the upper wall 21. The upper left member 20 also has a symmetrical pair of flanges 24 suspended from opposite ends of the upper wall 21 in the width direction and extending over the entire length of the upper wall 21 in the longitudinal direction.

The lower left member 30 has a bottom wall 31, a notched portion 32 notched substantially in an arc-like shape at a front end of the bottom wall 31, and a hole 33 formed by punching so as to penetrate the bottom wall 31 in the vertical direction at the rear of the bottom wall 31. The lower left member 30 also has a symmetrical pair of flanges 34 raised from opposite ends of the bottom wall 31 in the width direction and extending over the entire length of the bottom wall 31 in the longitudinal direction.

The upper left member 20 and the lower left member 30 constitute the left side member 10 having a closed cross-sectional shape, with the respective flanges 24 and 34 being welded correspondingly, typically by arc welding or the like, and integrated with each other. The upper left member 20 and the lower left member 30 can have a different plate thickness from each other.

A collar member 210 is arranged respectively on the notched portions 22 and 32 positioned so as to face each other vertically, in a mode in which vertical ends thereof project correspondingly from the upper wall 21 and the bottom wall 31, and is fixedly provided by being welded typically by the arc welding or the like. Further, the collar member 210 is respectively fitted to the holes 23 and 33 positioned so as to face each other vertically, in a mode in which vertical ends thereof project correspondingly from the upper wall 21 and the bottom wall 31, and is fixedly provided by being welded typically by the arc welding or the like.

<Configuration of Right Side Member>

The right side member 40 has an upper right member 50 and a lower right member 60, which have a substantially U-shaped vertical cross section, obtained typically by press-molding a plate member such as a steel plate, and has a leftward convex curved shape in a plan view. The right side member 40 can be constituted by a pipe member such as a steel pipe.

The upper right member 50 has an upper wall 51, a notched portion 52 notched substantially in an arc-like shape at a front end of the upper wall 51, and a hole 53 formed by punching so as to penetrate the upper wall 51 in the vertical direction at the rear of the upper wall 51. The upper right member 50 also has a symmetrical pair of flanges 54 suspended from opposite ends of the upper wall 51 in the width direction and extending over the entire length of the upper wall 51 in the longitudinal direction.

The lower right member 60 has a bottom wall 61, a notched portion 62 notched substantially in an arc-like shape at a front end of the bottom wall 61, and a hole 63 formed by punching so as to penetrate the bottom wall 61 in the vertical direction at the rear of the bottom wall 61. The lower right member 60 also has a symmetrical pair of flanges 64 raised from opposite ends of the bottom wall 61 in the width direction and extending over the entire length of the bottom wall 61 in the longitudinal direction.

The upper right member 50 and the lower right member 60 constitute the right side member 40 having a closed cross-sectional shape, with the respective flanges 54 and 64 being welded correspondingly, typically by arc welding or the like, and integrated with each other. The upper right member 50 and the lower right member 60 can have a different plate thickness from each other.

The collar member 210 is arranged respectively on the notched portions 52 and 62 positioned so as to face each other vertically, in a mode in which vertical ends thereof project correspondingly from the upper wall 51 and the bottom wall 61, and is fixedly provided by being welded typically by the arc welding or the like. Further, the collar member 210 is respectively fitted to the holes 53 and 63 positioned so as to face each other vertically, in a mode in which the vertical ends thereof project correspondingly from the upper wall 51 and the bottom wall 61, and is fixedly provided by being welded typically by the arc welding or the like.

<Configuration of Rear Cross Member>

The rear cross member 70 has a lower member 100 typically having a vertical section in a hat-like shape open downward, and including a first member 80 positioned at the front and obtained by press-molding a plate member such as a steel plate, and a second member 90 being a thinner plate than the first member 80 and facing the first member 80 at the rear of the first member 80, and an upper member 110 having a vertical section open downward, arranged to cover the lower member 100 from above, and connected to the lower member 100. The rear cross member 70 also has a holding member 200 connected to the lower member 100 and the upper member 110 in a mode in which the holding member 200 is sandwiched between the lower member 100 and the upper member 110, while penetrating an inside space R defined by the lower member 100 and the upper member 110 in cooperation in the longitudinal direction. The plate thickness of the upper member 110 can be set to be equal to either the plate thickness of the first member 80 or the plate thickness of the second member 90, or can be set differently from these thicknesses.

The first member 80 has an upper front wall 81, a front vertical wall 83 suspended from a front end of the upper front wall 81, and a front flange 82 projecting forward from a lower end of the front vertical wall 83. The front vertical wall 83 has, although not shown in the drawings, a left front through-hole formed by punching a left end in the central portion of the front vertical wall 83 so as to penetrate the front vertical wall 83 in the longitudinal direction, and a right front through-hole formed by punching a right end in the central portion of the front vertical wall 83 in the longitudinal direction. It is desired to arrange a guide member that guides a suspension arm (not shown) in the left front through-hole and the right front through-hole.

The front vertical wall 83 also has a front arc-like notched portion 86 notched downward, deviated toward the left front through-hole between the left front through-hole and the right front through-hole, that is, on the left side in the width direction. Corresponding thereto, the upper front wall 81 has a notched portion notched so as to penetrate the upper front wall 81 in the vertical direction, continuous to the front arc-like notched portion 86 in the rear direction. A height position of a central area of the upper front wall 81 in the width direction is set to be lower than a height position of opposite end areas of the upper front wall 81 in the width direction, that is, the central area of the upper front wall 81 in the width direction is set as a lower height area, and the opposite end areas of the upper front wall 81 in the width direction are set as higher height areas, and the front arc-like notched portion 86 is arranged in the lower height area. In terms of preventing unnecessary stress concentration on the first member 80, it is desired that the height position of the upper front wall 81 changes smoothly between the higher height area and the lower height area. The front flange 82 and the front vertical wall 83 can have a partially raised shape, with a front recess 87 (not shown) sunk upward, on the right front through-hole side between the left front through-hole and the right front through-hole.

The second member 90 has an upper rear wall 91, a rear vertical wall 93 suspended from the rear end thereof, and a rear flange 92 projecting rearward from a lower end of the rear vertical wall 93. The rear vertical wall 93 has a left rear through-hole 94 formed by punching a left end in the central portion of the rear vertical wall 93 so as to penetrate the rear vertical wall 93 in the longitudinal direction and facing the left front through-hole in the front vertical wall 83 at the rear thereof, and a right rear through-hole 95 formed by punching a right end in the central portion of the rear vertical wall 93 so as to penetrate the rear vertical wall 93 in the longitudinal direction and facing a right front through-hole 85 in the front vertical wall 83 at the rear thereof. It is desired to arrange a guide member 220 that guides a suspension arm (not shown) in the left rear through-hole 94 and the right rear through-hole 95.

The rear vertical wall 93 also has a rear arc-like notched portion 96 notched downward, deviated toward the left rear through-hole 94 between the left rear though hole 94 and the right rear through-hole 95, that is, on the left side in the width direction, and facing the front arc-like notched portion 86 of the front vertical wall 83 at the rear thereof. Correspondingly thereto, the upper rear wall 91 has a notched portion notched so as to penetrate the upper rear wall 91 in the vertical direction, continuous to the rear arc-like notched portion 96 in the front direction and continuous to the notched portion of the upper front wall 81. A height position of a central of the upper rear wall 91 in the width direction is set to be lower than a height position of opposite end areas of the upper rear wall 91 in the width direction, that is, the central area of the upper rear wall 91 in the width direction is set as a lower height area, and the opposite end areas of the upper rear wall 91 in the width direction are set as higher height areas, and the rear arc-like notched portion 96 is arranged in the lower height area. In terms of preventing unnecessary stress concentration on the second member 90, it is desired that the height position of the upper rear wall 91 changes smoothly between the higher height area and the lower height area. The rear flange 92 and the near vertical wall can have a partially raised shape, with a rear recess 97 sunk upward, on the side of the right rear through-hole 95 between the left rear through-hole 94 and the right rear through-hole 95, and facing the front recess 87 of the front vertical wall 83 at the rear thereof.

The first member 80 and the second member 90 are integrated with each other by welding a rear end of the upper front wall 81 of the first member 80 and a front end of the upper rear wall 91 of the second member, typically, by arc welding or the like, thereby constituting the lower member 100 having a vertical section in a hat-like shape open downward. The lower member 100 has an upper wall recess 101 with the upper wall thereof depressed downward, corresponding to the lower height area of the upper front wall 81 and the lower height area of the upper rear wall 91.

Meanwhile, the upper member 110 has a substantially U-shaped cross section, obtained typically by press-molding a plate member such, as a steel plate, and has an upper wall 111, a front wall 112 suspended from a front end of the upper wall 111, and a rear wall 113 suspended from a rear end of the upper wall 111. A lower end of the front wall 112 is welded typically by arc welding or the like to the front vertical wall 83 of the first member 80 and fixed thereto, and a lower end of the rear wall 113 is welded typically by arc welding or the like to the rear vertical wall 93 of the second member 90 and fixed thereto.

The upper member 110 defines the inside space R positionally corresponding to the upper wall recess 101, in cooperation with the lower member 100. In addition, the cylindrical holding member 200 intruded into the front arc-like notched portion 86 the first member 80 and the rear arc-like notched portion 96 of the second member 90 from above and placed on the upper member 110 is welded typically by arc welding or the like and fixed to the upper member 110 and the lower member 100, in a mode in which the cylindrical holding member 200 is sandwiched between the upper member 110 and the lower member 100, correspondingly to an area where the inside space R is defined positionally. In a state with the upper member 110 being fixed to the first member 80 and the second member 90, the inside space R is present between an outer surface of an upper semiperimeter of the holding member 200 and a lower surface of the upper wall 111 of the upper member 110.

In the central portion of the lower member 100 in the width direction, it is desired that a coupling member 120 that connects the front flange 82 of the first member 80 with the rear flange 92 of the second member 90 is welded typically by arc welding or the like and fixed thereto. The coupling member 120 is for reinforcing the strength and stiffness of the rear cross member 70, and is obtained typically by press-molding a plate member such as a steel plate. Particularly, in terms of further reinforcing the strength and stiffness of a portion where the holding member 200 is fixedly provided in the rear cross member 70, if is desired that the coupling member 120 is vertically overlapped on the holding member 200, as viewed in a plan view.

It is desired that the rear cross member 70 has a left end portion 72 having a larger width in the longitudinal direction than that of a central portion 71, as viewed in a plan view, and a connecting portion 73 that smoothly connects the central portion 71 with the left end portion 72, in terms of efficiently reinforcing the strength thereof, while suppressing an increase in the weight thereof. It is further desired to set a support portion of the suspension arm described later in detail in the central portion 71, in terms of reinforcing the strength and stiffness of the rear cross member 70, while efficiently configuring the support portion.

In the left end portion 72, it is desired that a peripheral edge of the rear vertical wall 93 of the second member 90 is notched so as to be depressed rightward, and welded to the left side member 10 typically by arc welding or the like, in terms of reinforcing the bonding strength of the portion. Further, it is desired that respective extended portions of the left end portion of the rear vertical wall 93 and the left end portion of the rear flange 92 round under the left side member 10 and the respective extended portions are welded to the left side member 10 typically by arc welding or the like, in terms of reinforcing the bonding strength of the portion.

Similarly, it is desired that the rear cross member 70 has a right end portion 74 having a larger width in the longitudinal direction than that of the central portion 71, as viewed in a plan view, and a connecting portion 75 that smoothly connects the central portion 71 with the right end portion 74, in terms of efficiently reinforcing the strength thereof, while suppressing an increase in the weight thereof.

In the right end portion 74, it is desired that a peripheral edge of the rear vertical wall 93 of the second member 90 is notched so as to be depressed leftward, and welded to the right side member 40 typically by arc welding or the like, in terms of reinforcing the bonding strength of the portion. Further, it is desired that respective extended portions of the right end portion of the rear vertical wall 93 and the right end portion of the rear flange 92 round under the right side member 40 and the respective extended portions are welded to the right side member 40 typically by arc welding or the like, in terms of reinforcing the bonding strength of the portion.

<Configuration of Front Cross Member>

The front cross member 130 has a third member 140 positioned at the front and obtained typically by press-molding a plate member such as a steel plate, and a fourth member 150 being a thinner plate than the third member 140 and facing the third member 140 at the rear of the third member 140.

The third member 140 includes an upper front wall 141, a front vertical wall 142 suspended from a front end of the upper front wall 141, and a front bottom wall 143 extending rearward from a lower end of the front vertical wall 142 and vertically facing the upper front wall 141. In addition, the third member 140 has a left front-end through-hole (not shown) formed by punching the left end portion of the front vertical wall 142 so as to penetrate the front vertical wall 142 in the longitudinal direction, and a right front-end through-hole 145 formed by punching the right end portion of the front vertical wall 142 so as to penetrate the front vertical wall 142 in the longitudinal direction.

The third member 140 has a front recess 148 having a concave shape upward in the central portion of the front vertical wall 142 in the width direction.

The fourth member 150 includes an upper rear wall 151, a rear vertical wall 152 suspended from the rear end of the upper rear wall 151, and a rear bottom wall 153 extending forward from a lower end of the rear vertical wall 152 and vertically facing the upper rear wall 151. In addition, the fourth member 150 has a left rear-end through-hole (not shown) formed by punching the left end portion of the rear vertical wall 152 so as to penetrate the rear vertical wall 152 in the longitudinal direction and facing the left front-end through-hole in the front vertical wall 142 at the rear thereof, and a right rear-end through-hole 155 formed by punching the right end portion of the rear vertical wall 152 so as to penetrate the rear vertical wall 152 in the longitudinal direction and facing the right front-end through-hole in the front vertical wall 142 at the tear thereof. A not member 230 is respectively arranged and fixed to the left rear-end through-hole and the tight rear-end through-hole 155.

The fourth member 150 has a rear recess 156 having a concave shape upward in the central portion of the rear vertical wall 152 in the width direction, and facing the front recess 148 in the front vertical wall 142 at the rear thereof.

It is desired that a left-end peripheral edge of the front cross member 130 is notched so as to be depressed rightward, specifically, the front vertical wall 142 of the third member 140 and the rear vertical wall 152 of the fourth member 150 are notched in a shape along the shape of an outer periphery of the left side member 10.

The portion notched as described above is welded to the left side member 10 typically by arc welding or the like and fixed thereto, in a mode in which the front vertical wall 142 of the third member 140 and the rear vertical wall 152 of the fourth member 150 respectively abut onto the left side member 10.

It is desired that a right-end peripheral edge of the front cross member 130 is notched so as to be depressed leftward, specifically, the front vertical wall 142 of the third member 140 and the rear vertical wall 152 of the fourth member 150 are notched in a shape along the shape of an outer periphery of the right side member 40.

The portion notched as described above is welded to the right side member 40 typically by arc welding or the like and fixed thereto, in a mode in which the front vertical wall 142 of the third member 140 and the rear vertical wall 152 of the fourth member 150 respectively abut onto the right side member 40.

<Configuration of Left Reinforcing Member and Right Reinforcing Member>

It is desired that a left reinforcing member 160 and a right reinforcing member 170 are welded respectively to the left end portion of the rear cross member 70 and the left end portion of the front cross member 130, and the right end portion of the rear cross member 70 and the right end portion of the front cross member 130 typically by arc welding or the like and fixed thereto, so as to couple the rear cross member 70 and the front cross member 130 correspondingly.

The left reinforcing member 160 is a substantially plate-like member obtained typically by press-molding a plate member such as a steel plate, and it is desired that a front end thereof is fixed to the rear vertical wall 152 of the fourth member 150 and a rear end thereof is fixed to the front vertical wall 83 of the first member 80, in terms of reinforcing the strength and stiffness. It is further desired that the left end of the left reinforcing member 160 is fixed to the left side member 10 in terms of further reinforcing the strength and stiffness.

The right reinforcing member 170 is a substantially plate-like member obtained typically by press-molding a plate member such as a steel plate, and it is desired that a front end thereof is fixed to the rear vertical wall 152 of the fourth member 150 and a rear end thereof is fixed to the front vertical wall 83 of the first member 80, in terms of reinforcing the strength and stiffness. It is further desired that the right end of the right reinforcing member 170 is fixed to the right side member 40 in terms of further reinforcing the strength and stiffness.

<Configuration of Left Support Member and Right Support Member>

A left support member 180 and a right support member 190 are respectively welded to right and left upper parts of the front cross member 130 at the opposite ends by arc welding or the like and fixed thereto, typically, so as to be overlapped thereon correspondingly.

The left support member 180 has a vertical section in a substantially hat-like shape open downward, which is obtained typically by press-molding a plate member such as a steel plate. The left support member 180 has a left front through-hole (not shown) formed by punching a left end of a front wall 181 thereof so as to penetrate the front wall 181 in the longitudinal direction, and a left rear through-hole 184 formed by punching a left end of a rear wall 183 thereof so as to penetrate the rear wall 183 in the longitudinal direction and facing the left front through-hole of the front wall 181 at the rear thereof. The nut member 230 is fixedly provided at the left rear through-hole 184.

The left support member 180 includes a front flange 185 extending forward from a bottom end of the front wall 181 and a rear flange 186 extending rearward from a bottom end of the rear wall 183. The front flange 185 and the rear flange 186 are welded to the left side member 10 typically by arc welding or the like and fixed thereto.

The right support member 190 has a vertical section in a substantially hat-like shape open downward, which is obtained typically by press-molding a plate member such as a steel plate. The right support member 190 has a right front through-hole 192 formed by punching a right end of a front wall 191 thereof so as to penetrate the front wall 191 in the longitudinal direction, and a right rear through-hole 194 formed by punching a right one of a rear wall 193 thereof so as to penetrate the rear wall 193 in the longitudinal direction and facing the right front through-hole 192 of the front wall 191 at the rear thereof. The nut member 230 is fixedly provided at the right rear through-hole 194.

The right support member 190 includes a front flange 195 extending forward from a bottom end of the front wall 191 and a rear flange 196 extending rearward from a bottom end of the rear wall 193. The front flange 195 and the rear flange 196 are welded to the right side member 40 typically by arc welding or the like and fixed thereto.

In the subframe 1 having the above configuration, four portions, that is, a first attachment portion A1, a second attachment portion A2, a third attachment portion A3, and a fourth attachment portion A4 are respectively set as portions mounted on a vehicle body. Further, six portions, that is, a first support portion S1, a second support portion S2, a third support portion S3, a fourth support portion S4, a fifth support portion S5, and a sixth support portion S6 are set as portions that support a suspension arm.

In the subframe 1, a differential-device holding portion D1 is set as a portion on which a component to be mounted, typically, the differential device is mounted.

In detail, the subframe 1 includes a first opening, a second opening, a third opening, a fourth opening, a fifth opening, and a sixth opening, being portions in which the inside of respective components constituting the subframe 1 is open to outside. Specifically, the first opening is a portion between the left front-end through-hole 144 and the left rear-end through-hole 154 of the front cross member 130, with the inside thereof being open to outside. The second opening is a portion between the right front-end through-hole 145 and the right rear-end through-hole 155 of the front cross member 130, with the inside thereof being open to outside. The third opening is a portion between the left front through-hole 84 and the left rear through-hole 94 of the rear cross member 70, with the inside thereof being open to outside. The fourth opening is a portion between the right front through-hole 85 and the right rear through-hole 95 of the rear cross member 70, with the inside thereof being open to outside. The fifth opening is a portion between the left front through-hole 182 and the left rear through-hole 184 of the left support member 180, with the inside thereof being open to outside. The sixth opening is a portion between the right front through-hole 192 and the right rear through-hole 194 of the right support member 190, with the inside thereof being open to outside.

Here, the first support portion S1, the second support portion S2, the third support portion S3, the fourth support portion S4, the fifth support portion S5, and the sixth support portion S6 are respectively set to the first opening, the second opening, the third opening, the fourth opening, the fifth opening, and the sixth opening correspondingly.

In detail, the first support portion S1 is arranged correspondingly to the first opening defined between the left front-end through-hole 144 and the left rear-end through-hole 154 fixedly provided with the nut member 230 of the front cross member 130. In the first support portion S1, a right pivot of a suspension arm (both not shown) is fastened and mounted by a fastening member such as a fastening bolt via the left front-end through-hole 144, the left rear-end through-hole 154, and the nut member 230 provided in the front cross member 130.

The second support portion S2 is arranged correspondingly to the second opening defined between the right front-end through-hole 145 and the right rear-end through-hole 155 fixedly provided with the nut member 230 of the front cross member 130. In the second support portion S2, a left pivot of the suspension arm (both not shown) is fastened and mounted by a fastening member such as a fastening bolt via the right front-end through-hole 145 the right rear-end through-hole 155, and the nut member 230 provided in the front cross member 130.

The third support portion S3 is arranged correspondingly to the left front through-hole 84 fixedly provided with the guide member 220 and the left rear through-hole 94 fixedly provided with the guide member 220 of the rear cross member 70. In the third support portion S3, the right pivot of the suspension arm (both not shown) is fastened and mounted by a fastening member such as a fastening bolt via the left front through-hole 84, the left rear through-hole 94, and the guide members 220 fixedly provided therein. Because the upper wall recess 101 extends in the longitudinal direction above the third support portion S3, deflection of the front vertical wall 83 and the rear vertical wall 93 due to an input load from the suspension arm in the longitudinal direction is suppressed, thereby enabling to improve the support strength and the support stiffness of the suspension arm.

The fourth support portion S4 is arranged correspondingly to the right front through-hole 85 fixedly provided with the guide member 220 and the right rear through-hole 95 fixedly provided with the guide member 220 of the rear cross member 70. In the fourth support portion S4, the left pivot of the suspension arm (both not shown) is fastened and mounted by a fastening member such as a fastening bolt via the right front through-hole 85, the right rear through-hole 95, and the guide members 220 fixedly provided therein. Because the upper wall recess 101 extends in the longitudinal direction above the fourth support portion S4, deflection of the front vertical wall 83 and the rear vertical wall 93 due to an input load from the suspension arm in the longitudinal direction is suppressed, thereby enabling to improve the support strength and the support stiffness of the suspension arm.

The fifth support portion S5 is arranged correspondingly to the left front through-hole 182 and the left rear through-hole 184 fixedly provided with the nut member 230 of the left support member 180. In the fifth support portion S5, the right pivot of the suspension arm (both not shown) is fastened and mounted by a fastening member such as a fastening bolt via the left front through-hole 182, the left rear through-hole 184, and the nut member 230.

The sixth support portion S6 is arranged correspondingly to the right front through-hole 192 and the right rear through-hole 194 fixedly provided with the nut member 230 of the right support member 190. In the sixth support portion S6, the right pivot of the suspension arm (both not shown)

is fastened and mounted by a fastening member such as a fastening bolt via the right front through-hole 192, the right rear through-hole 194, and the nut member 230.

The right and left pivots in the subframe 1 described above are suspension pivots positioned correspondingly to the right and left pivots (not shown) and facing the inside thereof in the width direction. The right and left pivots in the subframe 1 define positions of right and left rear wheels (not shown) in the longitudinal direction and the width direction correspondingly, and apply a relatively large external force to the subframe 1 mainly in the width direction. As a typical configuration of the right and left pivots, an insulator bush member having a configuration in which a rubber portion is bonded to a collar member into which a fastening member thereof is inserted, and having a small spring constant in the longitudinal direction and a large spring constant in the width direction can be mentioned. A spring reaction force of a suspension spring (not shown) can be applied to a predetermined pair of right and left pivots described above.

In the subframe 1 described above, the first attachment portion A1, the second attachment portion A2, the third attachment portion A3, and the fourth attachment portion A4 are set correspondingly.

In more detail, the first attachment portion A1 is arranged correspondingly to the collar member 210 fixedly provided at the front end of the left side member 10. In the first attachment portion A1, a rubber bush (not shown) is press-fitted to the collar member 210, and mounted on the vehicle body side by being fastened to the left rear side frame by a fastening member such as a fastening bolt (both not shown).

The second attachment portion A2 is arranged correspondingly to the collar member 210 fixedly provided at the rear end of the left side member 10. In the second attachment portion A2, a rubber bush (not shown) is press-fitted to the collar member 210, and mounted on the vehicle body side by being fastened to the left rear side frame by a fastening member such as a fastening bolt (both not shown).

The third attachment portion A3 is arranged correspondingly to the collar member 210 fixedly provided at the front end of the right side member 40. In the third attachment portion A3, a rubber bush (not shown) is press-fitted to the collar member 210, and mounted on the vehicle body side by being fastened to the right rear side frame by a fastening member such as a fastening bolt (both not shown).

The fourth attachment portion A4 is arranged correspondingly to the collar member 210 fixedly provided at the rear end of the right side member 40. In the fourth attachment portion A4, a rubber bush (not shown) is press-fitted to the collar member 210, and mounted on the vehicle body side by being fastened to the right rear side frame by a fastening member such as a fastening bolt (both not shown).

Further, in the subframe 1 described above, the differential-device holding portion D1 is also set correspondingly, and the differential-device holding portion D1 is arranged correspondingly to the holding member 200 of the rear cross member 70.

In more detail, the holding member 200 accommodates and holds a rubber bush and the like mounted on a differential device (both not shown) in the difference-device holding portion D1. Because the holding member 200 is fixedly provided in a mode in which the holding member 200 is sandwiched between the lower member 100 and the upper member 200, the strength and stiffness of the bonding portion of the holding member 200 in the rear cross member 70 can be improved, thereby enabling to realize the differential-device holding portion D1 that can reliably hold the differential device.

Various types of the holding member 200, the collar member 210, the guide member 220, and the nut member 230 are typically made of metal such as a steel material.

In the embodiment described above, the suspension arm can be a suspension arm other than the suspension arm described in the present embodiment, so long as it has the same function.

Further, in the embodiment described above, the subframe 1 can be mounted on a vehicle body, not in a so-called "floating format" but in a so-called "rigid format".

In the present invention, the type, the form, the arrangement, the number, and the like of the constituent members are not limited to those in the embodiment explained above, and it is needless to mention that the constituent elements can be modified as appropriate without departing from the scope of the invention, such as appropriately replacing these elements by other ones having identical operational effects.

The entire content of a Patent Application, No. TOKUGAN 2015-109951 with a filing date of May 29, 2015 in Japan is hereby incorporated by reference.

What is claimed is:
1. A vehicle subframe comprising:
   a pair of side members respectively extending in a longitudinal direction of a vehicle, while facing each other in a width direction of the vehicle; and
   a pair of cross members respectively extending in the width direction, while facing each other in the longitudinal direction, and respectively coupling the pair of side members,
   wherein one of the pair of cross members includes a lower member open to a lower side of the vehicle, with an upper wall thereof having an upper wall recess depressed downward, an upper member arranged so as to cover the upper wall recess from above the vehicle and connected to the lower member, an inside space defined by the lower member and the upper member in cooperation, and a holding member connected to the lower member and the upper member in a mode in which the holding member is sandwiched between the lower member and the upper member, while penetrating the inside space in the longitudinal direction in correspondence with a position in which the upper wall recess is provided, to hold a component to be mounted, the holding member being connected to the lower member and the upper member in correspondence with the position in which the upper wall recess is provided.

2. The vehicle subframe according to claim 1, wherein the holding member is arranged to be deviated from a central portion of the lower member and the upper member in the width direction, and the lower member has a lower recess depressed toward an upper side of the vehicle and arranged with the holding member in the width direction.

3. The vehicle subframe according to claim 1, wherein the one of the pair of cross members is a rear cross member arranged on a rear side in the longitudinal direction, and the rear cross member includes a first member having a first vertical wall and a first upper wall continuous to the first vertical wall, and a second member having a second vertical wall facing the first vertical wall in the longitudinal direction and a second upper wall continuous to the second vertical wall and connected to the first upper wall, and a plate thickness of the first member is set to be equal to or larger than that of the second member.

4. The vehicle subframe according to claim 3, wherein the other of the pair of cross members is a front cross member arranged on a front side in the longitudinal direction, and a reinforcing member connecting the rear cross member with the front cross member is further provided.

5. The vehicle subframe according to claim 4, wherein the front cross member includes a third member having a third vertical wall, a third upper wall continuous to the third vertical wall, and a third lower wall continuous to the third vertical wall, and a fourth member having a fourth vertical wall facing the third vertical wall in the longitudinal direction, a fourth upper wall continuous to the fourth vertical wall and connected to the third upper wall, and a fourth lower wall continuous to the fourth vertical wall and connected to the third lower wall, and a plate thickness of the third member is set to be equal to or larger than that of the fourth member.

6. The vehicle subframe according to claim 5, wherein the reinforcing member connects the first member with the fourth member.

\* \* \* \* \*